United States Patent
Lin et al.

(10) Patent No.: US 9,647,853 B2
(45) Date of Patent: May 9, 2017

(54) TRANSMITTING SYSTEM, THE DEVICE AND THE METHOD FOR THE REMOTE BUS

(71) Applicant: SUNIX CO., LTD., New Taipei (TW)

(72) Inventors: Ming-Cheng Lin, New Taipei (TW); Hung-Chou Lin, New Taipei (TW); Chun-Hung Lee, New Taipei (TW); Kai-Tong Jian, New Taipei (TW)

(73) Assignee: Sunix Co., Ltd., New Taipei (TW)

( * ) Notice: Subject to any disclaimer, the term of this patent is extended or adjusted under 35 U.S.C. 154(b) by 396 days.

(21) Appl. No.: 14/311,427

(22) Filed: Jun. 23, 2014

(65) Prior Publication Data
US 2015/0215134 A1  Jul. 30, 2015

(30) Foreign Application Priority Data
Jan. 29, 2014  (TW) .............................. 103103385 A

(51) Int. Cl.
*H04L 12/28*  (2006.01)
*H04L 12/46*  (2006.01)

(52) U.S. Cl.
CPC .................. *H04L 12/462* (2013.01)

(58) Field of Classification Search
CPC ................................................... H04L 12/462
See application file for complete search history.

(56) References Cited

U.S. PATENT DOCUMENTS

| | | | | |
|---|---|---|---|---|
| 4,451,916 A | * | 5/1984 | Casper | H04B 10/2504 370/226 |
| 2003/0033452 A1 | * | 2/2003 | Himmel | H04W 74/06 710/9 |
| 2005/0125549 A1 | * | 6/2005 | Katayama | H04L 67/10 709/230 |

* cited by examiner

*Primary Examiner* — Gbemileke J Onamuti
(74) *Attorney, Agent, or Firm* — Rosenberg, Klein & Lee

(57) ABSTRACT

A transmitting system, the device and the method for the remote bus applies to control the remote device via network. The transmitting system comprises of a main computer and a bridge device. The main computer includes a first process unit, a storage unit, a first network port and an agent program. The first process unit dispatches the agent program, and sets up the address space and the connection channels according to the identify information. The bridge device couples to the main computer and the target device. The agent program divides the operation command and generates the first package. The main computer sends the first package to the bridge device via the first network port. The bridge device recovers the first package to the operation command, and drives the target device according to the operation command.

10 Claims, 7 Drawing Sheets

TRANSMITTING SYSTEM, THE DEVICE AND THE METHOD FOR THE REMOTE BUS

BACKGROUND OF THE INVENTION

1. Field of the Invention

The instant disclosure relates to a controlling and transmitting system, the device and the operation method thereof; in particular, to a transmitting system, the device and the method for the remote bus.

2. Description of Related Art

With the rapid development of Internet, many electronic devices are equipped with remote control functions. For example, an audio and video player could be remote controlled via network. The unreliable characteristic of the network could be endurable for image transmission or audio transmission, because a small segment loss of the audio and video data is acceptable for the user.

However, not all electronic devices are adapted to remote control, especially for the transmission of the serial port and the parallel port. These interfaces need complete control command for operation, thus an incomplete control command would make a wrong control to the electronic device having the aforementioned interface and the electronic device may be damaged. For an operation system, the controlling of the electronic device having the existing serial port needs division for the address space and configuration of the transmitted command. Thus, the aforementioned communication interfaces require continuous transmission. In other words, the electronic device of prior art is directly electrically connected to the main computer, thus the main computer could controls the target device via the related bus. The main computer of the prior art could realize the control purpose for the target device utilizing controlling means about clock, addressing or interrupt via the bus.

However, the conventional network transmission architecture converts data to frame for processing the transmission. Utilizing the slide frame to transmit the data in time division which has disadvantage of unreliable such as loss of packages. In the event of loss packages, the remote electronic device may perform wrong operation or continuous waiting. When the electronic device performs wrong operation, it would cause problem as minor as damaging the machine; or as major as public security accident.

Although, the TCP protocol of the Ethernet can achieve the objective of reliable transmission, the transmission sequence of the TCP packages could not reach the real-time requirement due to the characteristic of the command of the aforementioned transmission interface. Therefore, real-time control to the target device could not be achieved via the network.

SUMMARY OF THE INVENTION

The object of the instant disclosure is to provide a transmitting system for the remote bus, for offering the main computer to make the access of the remote target device.

In order to achieve the aforementioned objects, according to an embodiment of the instant disclosure, a transmitting system for the remote bus is offered. The transmitting system for the remote bus is for controlling a remote target device via a network. The transmitting system for the remote bus comprises a main computer, a bridge device and a target device. The main computer has a first processing unit, a storage unit and a first network port. The first processing unit is connected to the storage unit and the first network port. The first processing unit executes an agent program in the storage unit. The first processing unit dispatches the agent program to set up an address space and a plurality of connection channels according to a received identify information. The bridge device comprises a second processing unit, a second network port and a heterogeneous interface port. The second processing unit is connected to the second network port and the heterogeneous interface port. The second network port is connected to the first network port of the main computer. The heterogeneous interface port is connected to the target device. The bridge device transmits the identify information via the second network port. The agent program divides the operation command and packages each segment of the operation command as a first package according to the plurality of connection channels. The main computer sends the first packages to the bridge device via the first network port. The bridge device determines the sequence of the received first network packages and combines the first network packages to recovers the first package to the operation command. The bridge device drives the target device according to the operation command.

In order to achieve the aforementioned objects, according to an embodiment of the instant disclosure, a bridge device of the remote bus is offered. The bridge device of the remote bus comprises a main network port, a heterogeneous interface port and a processing unit. The main network port is connected to a main computer via a network, for receiving a plurality of first network packages from the main computer or transmitting a plurality of second network packages to the main computer. The heterogeneous interface port is electrically connected to a target device. The processing unit is connected to the main network port and the heterogeneous interface port. The processing unit identifies the sequence of the first network package according to a connection channel of each first network port. The processing unit recombining the first network packages to obtain an operation command. The processing unit transmitting the operation command to the target device via the heterogeneous interface port.

In order to achieve the aforementioned objects, according to an embodiment of the instant disclosure, a transmitting method for the remote bus is offered. The transmitting method for the remote bus comprising a main computer receiving a identify information of a bridge device, for setting up an address space and a plurality of connection channels; the main computer making a dividing process for an operation command according to the address space and the plurality of connection channels, and packaging each divided segment of the operation command to be a first network package; the main computer transmitting the first network packages to the bridge device via the network according to the sequence of the connection channels; the bridge device recombining the first network packages according to the sequence of the first network packages to obtain the operation command; and the bridge device transferring the operation command to a target device.

In summary, the transmitting system for remote control via network, the bridge device and the transmitting method could abstract the converting of the network packages for the target device, thus the main computer could fast converts the network packages. And, the bridge device could react to the transmission sequence of the network packages, in order to ensure the real-time control of the target device.

In order to further the understanding regarding the instant disclosure, the following embodiments are provided along with illustrations to facilitate the disclosure of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
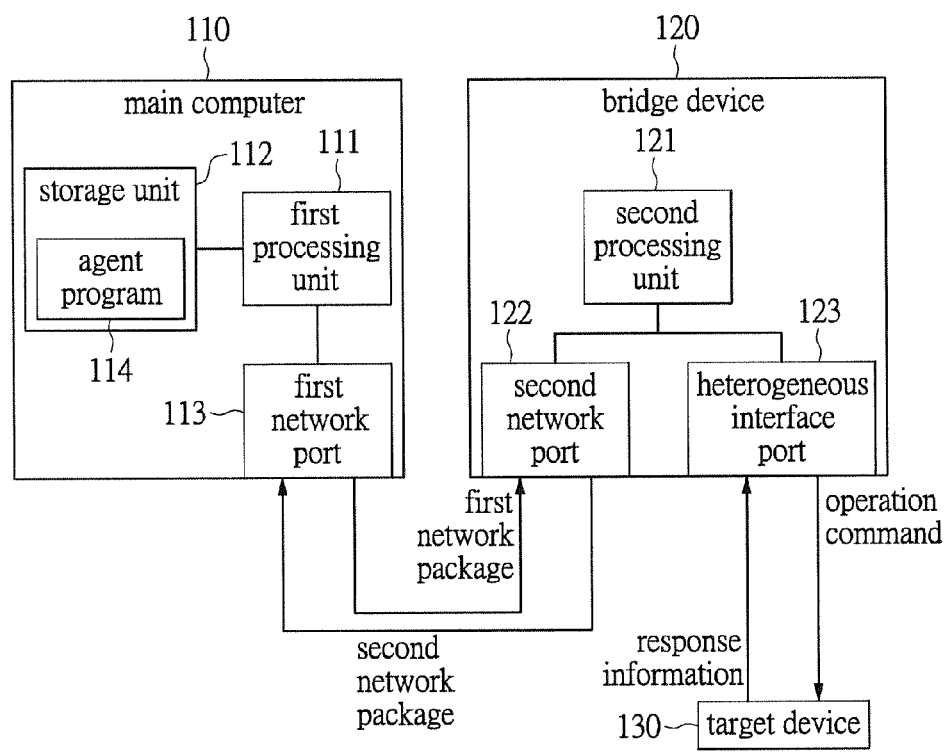
FIG. 1 shows a schematic diagram of an architecture of the present invention according to an embodiment of the instant disclosure.

Please refer to FIG. 1 showing a schematic diagram of an architecture of the present invention according to a first embodiment of the instant disclosure. The transmitting system comprises a main computer 110, a bridge device 20 and a target device 130. The main computer 110 is connected to the bridge device 120 via a network. The bridge device 120 is further connected to the target device 130. The network in the present invention may be Internet or Intranet. For ease of explanation, the Intranet is used in the embodiments; however an artisan of ordinary skill in the art will appreciate to apply the technique to the environment of Internet.

The main computer 110 has a first processing unit 111, a storage unit 112 and a first network port 113. The first processing unit 111 is connected to the storage unit 112 and the first network port 113. The main computer 110 of the present invention makes a general reference to a calculator having network connectivity. The first network port 113 could be embodied by wire-connection manner or wireless-connection manner. The mentioned calculator may be but not restricted to a personal computer (PC), a notebook or a tablet PC . . . etc.

The main computer 110 transmits the operation command to the bridge device 120 or receives output information from the bridge 120 via the first network port 113. The type of the first network 113 may be but not restricted to a wired Ethernet, or a wireless network. The storage unit 112 stores an agent program 114. The first processing unit 111 executes the agent program 114. The agent program not only is for searching the bridge device 120, transmitting the operation command or receiving the response information, but also is for the process of dividing the aforementioned operation command in the a plurality of network packages. The agent program 114 may be an independent application, or built in the operation system. The first processing unit 111 deploys the agent program 114 according to the identification information transmitted from the bridge device 120 for setting up an address space and a plurality of connection channels. The agent program 114 simulates the transmission manner of the bus between the target device 130 and the main computer 110 according to the address space and the plurality of connection channels.

The bridge device 120 comprises a second processing unit 121, a second network port 122 and at least a heterogeneous interface port 123. The second processing unit 121 is electrically connected to the second network port 122 and the heterogeneous interface port 123. The second processing unit 121 is used for recombining the received network packages or converts the returned information from the target device 130 to network packages. The second network port 122 of the bridge device 120 is connected to the first network port 113 of the main computer 110 via the network. The bridge device 120 transmits the identify information to the main computer 110 via the second network port 122. The identify information records the model of the bridge device 120 and the amount of the heterogeneous interface ports 123. The heterogeneous interface port 123 is connected to the target device 130, and the type of the heterogeneous port 123 is corresponding to the type of the target device 130. The type of the heterogeneous port 123 may be the parallel port, the serial port, the digital I/O or the Universal Asynchronous Receiver/Transmitter. In other words, if the target device 130 is a device having the RS-232 port, the heterogeneous interface port 123 is the RS-232 port. The network packages transmitted from the main computer 110 to the bridge device 120 are defined as the first network packages. The network packages transmitted from the bridge device 120 to the main computer 110 are defined as the second network packages.

Figure 2A:
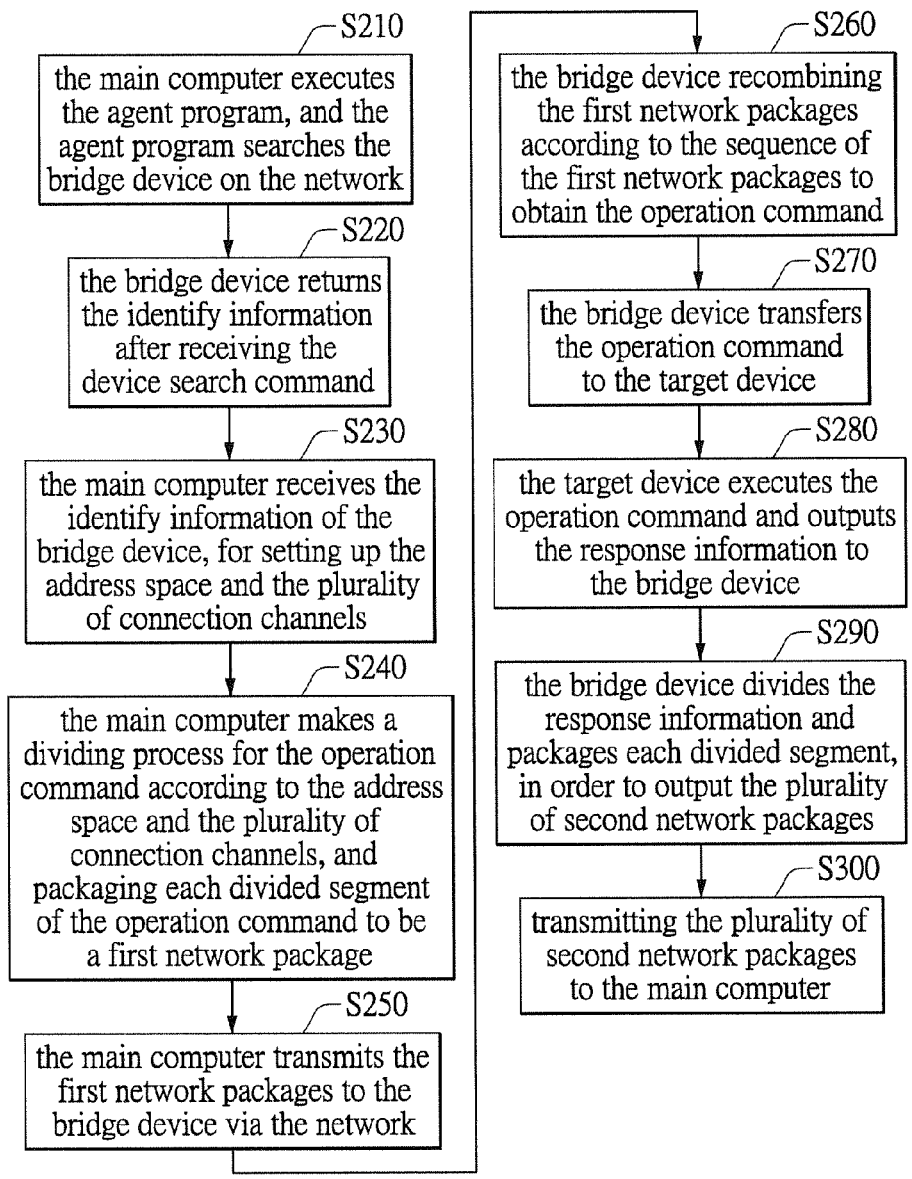
FIG. 2A shows a flow chart of the present invention according to an embodiment of the instant disclosure.

Please refer to FIG. 2A for further understanding the operation of the present invention. The transmitting method of the present invention comprises following steps:

S210: the main computer executes the agent program, and the agent program searches the bridge device on the network;

S220: the bridge device returns the identify information after receiving the device search command;

S230: the main computer receives the identify information of the bridge device, for setting up the address space and the plurality of connection channels;

S240: the main computer makes a dividing process for the operation command according to the address space and the plurality of connection channels, and packaging each divided segment of the operation command to be a first network package;

S250: the main computer transmits the first network packages to the bridge device via the network;

S260: the bridge device recombining the first network packages according to the sequence of the first network packages to obtain the operation command;

S270: the bridge device transfers the operation command to the target device;

S280: the target device executes the operation command and outputs the response information to the bridge device;

S290: the bridge device divides the response information and packages each divided segment, in order to output the plurality of second network packages; and S300: transmitting the plurality of second network packages to the main computer.

Figure 2B:
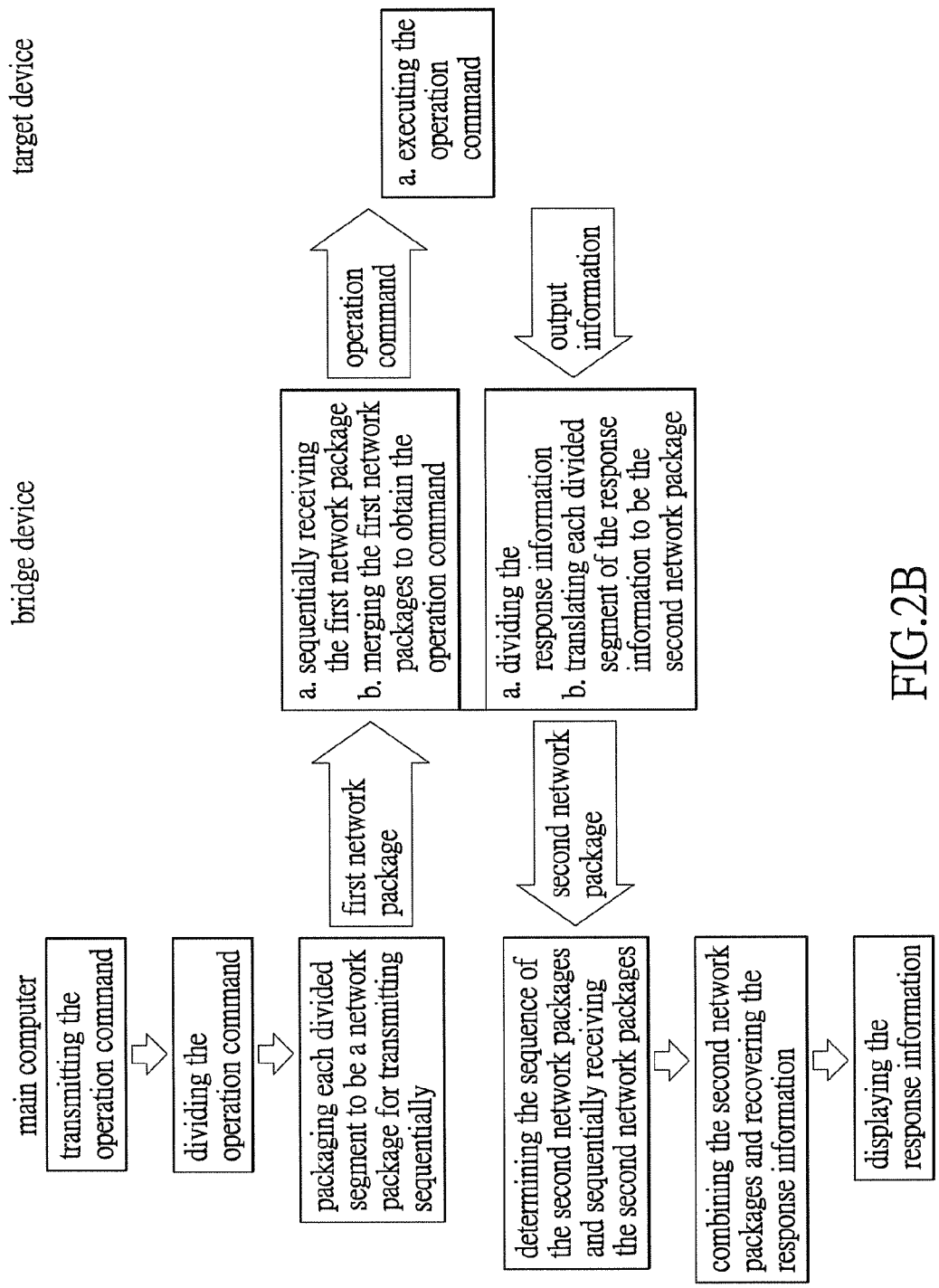
FIG. 2B shows an operation scheme of the present invention according to an embodiment of the instant disclosure.
Figure 3A:
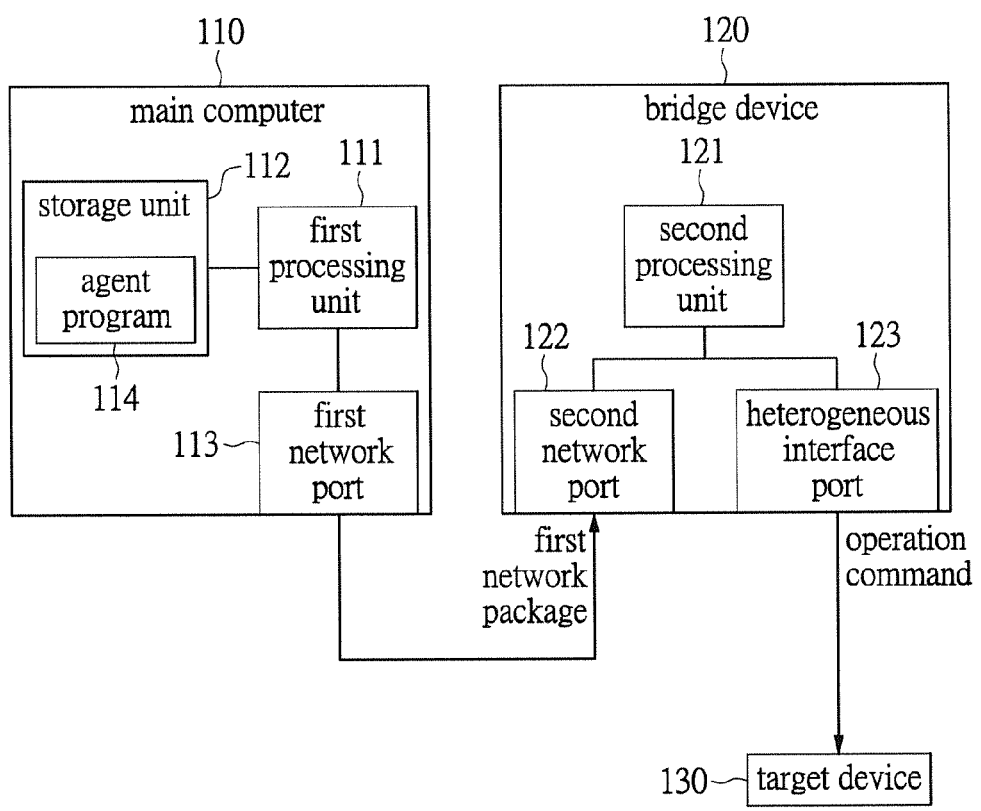
FIG. 3A shows a schematic diagram of the transmission of the operation command according to an embodiment of the instant disclosure.
Figure 3B:
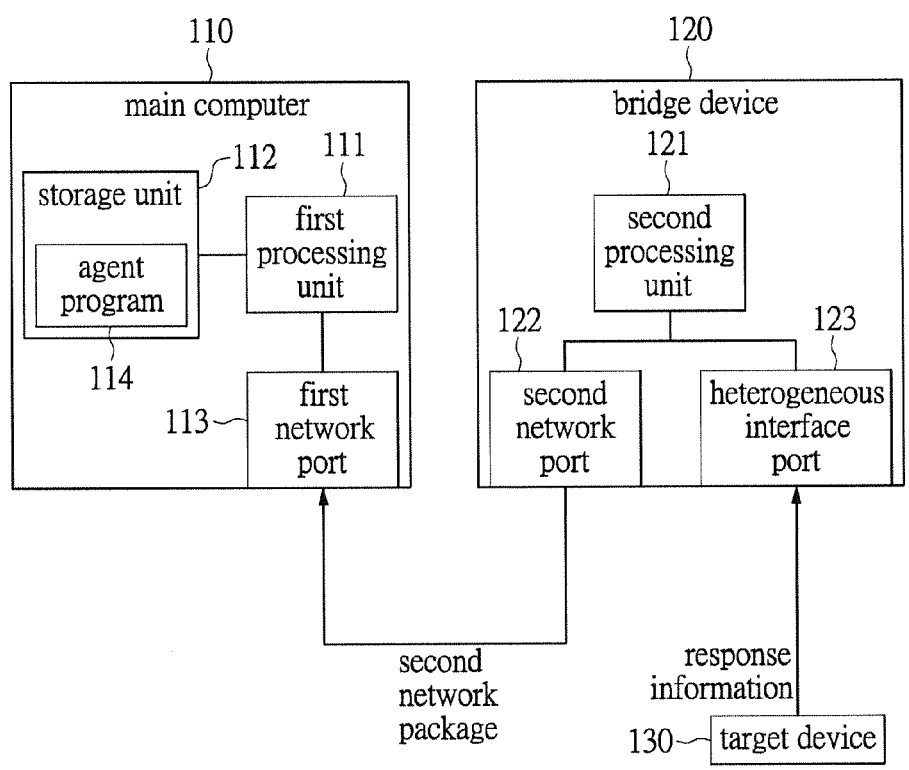
FIG. 3B shows a schematic diagram of the transmission of the response information according to an embodiment of the instant disclosure.

In order to explain the whole operation, please refer to FIG. 2B in conjunction with FIG. 3A and FIG. 3B. Firstly, the main computer 110 starts to execute the agent program 114. The agent program 114 searches the bridge device 120 on the network. When the bridge device 120 receives the equipment search command, the bridge device 120 returns the corresponding identify information. The identify information records the type and the amount of the ports of the bridge device 120, the model of the target device 130 or the bridge device 120.

When the main computer 110 receives the identify information, the main computer 110 could generate the address space and the plurality of connection channels according to the identify information. The size of the address space is determined by the type of the target device 130. The amount of the connection channels may be determined according to the target device 130 or be default as a constant amount. Because the target device 130 is connected to the main computer 110 via the network, the main computer 110 needs to generate the corresponding address space for the purpose of address access of the main computer 110.

When the main computer 110 transmits the operation command (or operation data) to the target device 130, the agent program 114 would make a dividing process for the operation command. In this present invention, the agent program 114 divides the operation command into a plurality segments according to the amount of the connection channels. Thus, the agent program 114 would output the divided segments with the amount the same as to the amount of the connection channels. The agent program 114 obtains an offset corresponding to each divided segment of the operation command. Because the transmission sequence of each offset is controlled, both of the transmitting end and the receiving end (the main computer 110 and the target device 130) could ensure the received sequence of the network packages, which could be embodied by hardware, and the processing speed of the hardware is more efficient than the analyzing speed of the software layer.

For ease of explanation for the divided operation command (or operation data), each divided part of the operation command is defined as a divided segment. The agent program 114 converts the divided segments and the corresponding offsets to the first network packages in sequence according to the connection channels, and transmits the first network packages to the bridge devices 120.

Figure 4A:
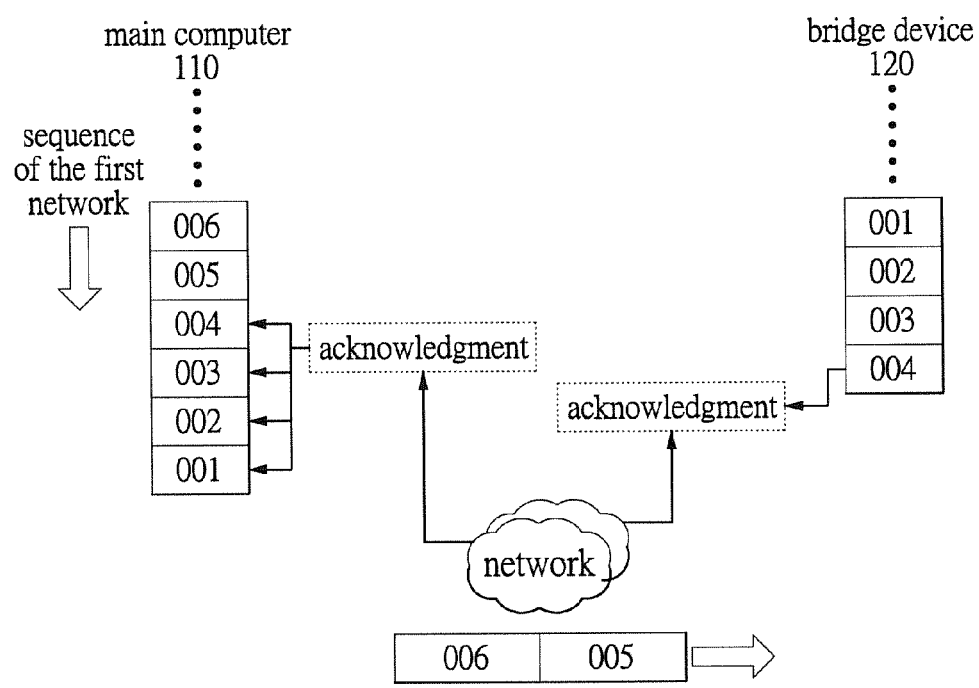
FIG. 4A shows a schematic diagram of packages transmission which is acknowledged according to an embodiment of the instant disclosure.
Figure 4B:
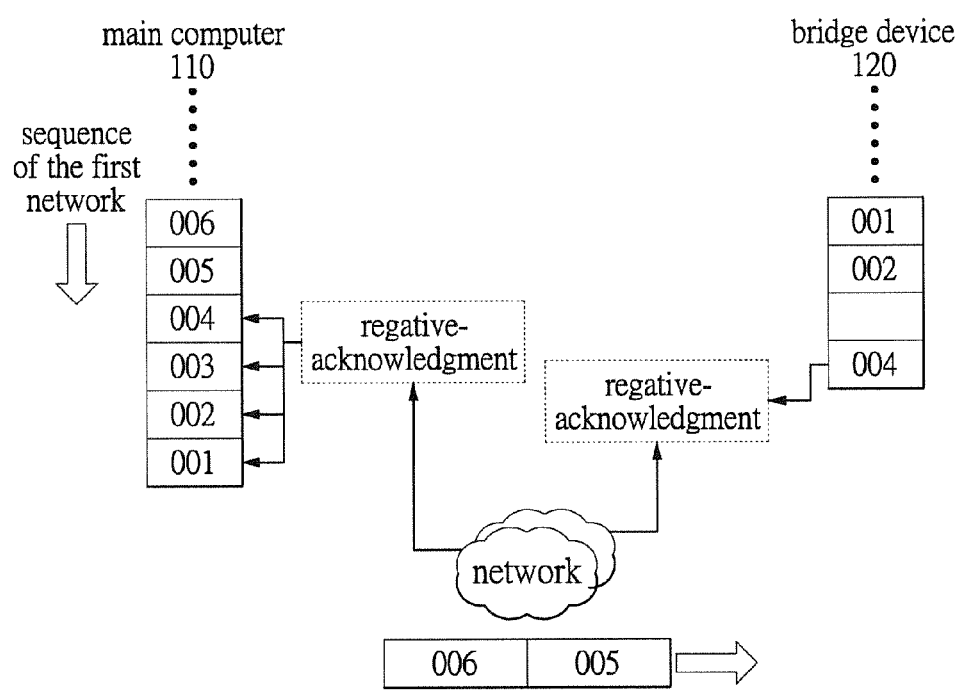
FIG. 4B shows a schematic diagram of packages transmission which is negative-acknowledged according to an embodiment of the instant disclosure.

After the bridge device 120 receiving the first network packages, the bridge device 120 determines whether the sequence of the first network packages is correct according the sequence of the record offsets in the connection channels. Please refer to FIG. 4A in conjunction with FIG. 4B which show the receiving sequences of the first network packages. The left portions of the FIG. 4A and FIG. 4B show the sequences of the first network packages transmitted from the main computer 110, the right portions show the sequence of the network packages receiving by the bridge device 120.

The bridge device 120 of the present invention determines whether the amount of the continuously received first network packages is larger than a preset amount. When the amount of the continuously received first network packages is larger than the present amount, the bridge device 120 would return an acknowledgment (ACK) to the main computer 110. When the main computer 110 receives the acknowledgment, the main computer 110 would transmit the rest first network packages to the bridge device 120. For example, the main computer 110 serially transmits the first network packages 001, 002, 003 and 004 to the bridge device 120. When the bridge device 120 serially receives the first network packages 001, 002, 003 and 004, the bridge device 120 would transmit the acknowledge to the main computer 110 and request the main computer 110 to further transmit subsequent first network packages 005, 006. Then, the bridge device 120 would counts from the first network package 005 to determine whether the amount of the continuously received first network packages is larger than the preset amount.

When the sequence of the first network packages received by the bridge device 120 is not continuous, the bridge device 120 would request the main computer 110 to re-transmit the lost first network package(s). As shown in FIG. 4, the bridge device 120 does not receive the first network package 003, but the bridge device 120 receives the first network package 004 in previous. Then, the bridge device 120 would transmit a negative-acknowledgment (NAK) of the first network package 003. And, the bridge device 120 stops receiving the first network packages after the first network package 003. That is, the bridge device 120 would drop the first network package 004 (and the subsequent first network packages 005, 006) and the bridge device 120 would wait for the first network package 003.

When the main computer 110 receives the negative-acknowledgment, the main computer 110 would stop transmitting the current transmitting first network packages, and re-transmit the first network package 003 which was not received by the bridge device 120. As shown in FIG. 4B, the bridge device 120 does not receives the first network package 003, and thus starting from the first network package 003 the main computer 110 would re-transmit the rest sequent first network packages 004, 005, 006.

Then, the bridge device 120 recombines the received first network packages, in order to obtain the operation command for the target device 130. The bridge device 120 transmits the operation command to the target device 130 via the heterogeneous interface port 123. The target device 130 executes corresponding operation according to the operation command. After the target device 130 completes the operation, the target device 130 may output corresponding results. Meanwhile, the target device 130 would output the operation result to the bridge device 120.

The bridge device 120 executes the dividing process for the operation result according to the amount of the connection channels in the same way. The bridge device 120 packages each divided segment to a second network package, and transmits the second network packages to the main computer 110. The transmission and processing manners for the second network packages are the same as that for the first network packages, thus the redundant information is not repeated. When the main computer 110 receives the second network packages, the main computer 110 recombines the second network packages to obtain the operation result of the target device 130.

Besides the aforementioned operation command and the data transmission, the same dividing and transmission process could be applied to the interrupt. This invention could utilize different connection channels to transmit different interrupt request (IRQ). By utilizing the aforementioned transmitting method, the received sequence for the interrupt request received by the target device 130 could be ensured. Therefore, the target device 130 could carry out corresponding process according to the correct interrupt request.

According to above descriptions, the transmitting system for remote control via network, the bridge device 120 and the transmitting method could abstract the converting of the network packages for the target device 130, thus the main computer 110 could fast converts the network packages. And, the bridge device 120 could react to the transmission sequence of the network packages, in order to ensure the real-time control of the target device 130.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A transmitting system for the remote bus, for controlling a remote target device via a network, the transmitting system for the remote bus comprising:
   a main computer, having a first processing unit, a storage unit and a first network port, the first processing unit connected to the storage unit and the first network port, the first processing unit executing an agent program in the storage unit, the first processing unit dispatching the agent program to set up an address space and a plurality of connection channels according to a received identify information; and
   a bridge device, comprising a second processing unit, a second network port and a heterogeneous interface port, the second processing unit connected to the second network port and the heterogeneous interface port, the second network port connected to the first network port of the main computer, the heterogeneous interface port connected to the target device, the bridge device transmitting the identify information via the second network port;
   wherein the agent program divides an operation command and packages each segment of the operation command as a first package according to the plurality of connection channels, the main computer sends the first packages to the bridge device via the first network port; the bridge device determines a sequence of the received first network packages and combines the first network packages to recovers the first package to the operation command, the bridge device drives the target device according to the operation command;
   wherein when the bridge device receives the first network packages out of order, the bridge device transmits a negative-acknowledge to the main computer according the ordered last first network package of the plurality of received first network packages, in order to request the main computer to re-transmit the first network packages starting from the ordered last first network package received by the bridge device.

2. The transmitting system for the remote bus according to claim 1, wherein the main computer transmits an equipment search command for searching the bridge device on the network, and the bridge transmits an identify information to the main computer when the bridge device receives the equipment search command.

3. The transmitting system for the remote bus according to claim 1, wherein the connection channel is used for transmitting an offset of the operation command.

4. The transmitting system for the remote bus according to claim 1, wherein the bridge device receives a response information returned from the target device, the bridges divides the response information according to the connection channels and outputs the divided segments of the response information as a plurality of second network packages, the bridge device transmits the plurality of second network packages to the main computer.

5. A bridge device of the remote bus, comprising:
   a main network port, connected to a main computer via a network, for receiving a plurality of first network packages from the main computer or transmitting a plurality of second network packages to the main computer;
   a heterogeneous interface port, electrically connected to a target device; and
   a processing unit, connected to the main network port and the heterogeneous interface port, the processing unit identifying a sequence of the first network package according to a connection channel of each first network port, the processing unit recombining the first network packages to obtain an operation command, the processing unit transmitting the operation command to the target device via the heterogeneous interface port;
   wherein when the bridge device receives the first network packages out of order, the bridge device transmits a negative-acknowledge to the main computer according the ordered last first network package of the plurality of received first network packages, in order to request the main computer to re-transmit the first network packages starting from the ordered last first network package received by the bridge device.

6. The bridge device of the remote bus according to claim 5, wherein the bridge device receives an output information from the target device, the bridge device divides the output information according to the connection channels for outputting a plurality of second network packages.

7. A transmitting method for the remote bus, comprising:
   a main computer receiving a identify information of a bridge device, for setting up an address space and a plurality of connection channels;
   the main computer making a dividing process for an operation command according to the address space and the plurality of connection channels, and packaging each divided segment of the operation command to be a first network package;
   the main computer transmitting the first network packages to the bridge device via a network according to a sequence of the connection channels;
   the bridge device recombining the first network packages according to a sequence of the first network packages to obtain the operation command; and
   the bridge device transferring the operation command to a target device;
   wherein when the bridge device receives the first network packages out of order, the bridge device transmits a negative-acknowledge to the main computer according the ordered last first network package of the plurality of received first network packages, in order to request the main computer to re-transmit the first network packages starting from the ordered last first network package received by the bridge device.

8. The transmitting method for the remote bus according to claim 7, wherein the step of making the dividing process for the operation command further comprising:
   obtaining an offset of each divided segment of the operation command according to the dividing result of the operation command.

9. The transmitting method for the remote bus according to claim 8, wherein when the target device receives the operation command, the target device further executing following steps:
   the target device executing the operation command, and outputs a response information to the bridge device;
   the bridge device dividing the response information according to the amount of the connection channels, and packaging the divided segments of the response information in order to output a plurality of second network packages; and
   transmitting the plurality of second network packages to the main computer.

10. The transmitting method for the remote bus according to claim 7, wherein the step of the bridge device receiving the plurality of first network packages further comprising:

when the bridge device receives the plurality of first network packages sequentially and the amount of the first network packages is larger than a preset amount, the bridge device transmitting an acknowledge to the main computer.

* * * * *